(12) United States Patent
Hu et al.

(10) Patent No.: US 9,436,731 B2
(45) Date of Patent: Sep. 6, 2016

(54) INDEX-BASED OPTIMIZATION OF CONVEX HULL AND MINIMUM BOUNDING CIRCLE QUERIES

(71) Applicant: ORACLE INTERNATIONAL CORPORATION, Redwood Shores, CA (US)

(72) Inventors: Ying Hu, Hollis, NH (US); Siva Ravada, Nashua, NH (US); Richard James Anderson, Jr., Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 14/200,415

(22) Filed: Mar. 7, 2014

(65) Prior Publication Data

US 2015/0254302 A1  Sep. 10, 2015

(51) Int. Cl.
*G06F 17/30* (2006.01)
(52) U.S. Cl.
CPC ... *G06F 17/30442* (2013.01); *G06F 17/30327* (2013.01); *G06F 17/30336* (2013.01)
(58) Field of Classification Search
None
See application file for complete search history.

(56) References Cited

U.S. PATENT DOCUMENTS 5,801,966 A * 9/1998 Ohashi ................... G01B 11/24
                                                            382/145
8,386,468 B2    2/2013 Hu et al.
2005/0203932 A1* 9/2005 Kothuri ............. G06F 17/30241

OTHER PUBLICATIONS

Böhm et al.; "Determining the convex hull in large multidimensional databases"; Data Warehousing and Knowledge Discovery; Springer Berlin Heidelberg; 2001; pp. 294-306.*
Wikipedia; Convex Hull Algorithms: http://en.wikipedia.org/wiki/Convex_hull_algorithms; pp. 1-5.
Wikipedia; Graham Scan: http://en.wikipedia.org/wiki/Graham_scan; pp. 1-3.
Wikipedia; Smallest-Circle Problem: http://en.wikipedia.org/wiki/Smallest_circle_problem; pp. 1-4.
Emo Welzl; Smallest Enclosing Disks; Appeared in "New Results and New Trends in Computer Science", (H. Maurer, Ed.), Lecture Notes in Computer Science 555 (1991) pp. 359-370; Berlin, Germany.

(Continued)

*Primary Examiner* — Alex Gofman
*Assistant Examiner* — Umar Mian
(74) *Attorney, Agent, or Firm* — Kraguljac Law Group, LLC

(57) ABSTRACT

Systems, methods, and other embodiments associated with index-based optimization of geometric figured-related queries are described. In one embodiment, a method includes receiving two points selected from a corpus of spatial data. A hierarchical index on the data is accessed to choose candidate nodes. The index is a hierarchical arrangement of nodes arranged in paths from root node entries to leaf node entries such that each node is contained in all nodes in a path leading to the node. The method includes determining a spatial relationship between the two points and the candidate nodes in the index. The candidate nodes are a proper subset of the nodes in the index, such that the spatial relationship is not determined between the two points and some non-candidate nodes. A candidate node is selected based on the determined angles for processing related to construction of a geometric figure describing the spatial data.

17 Claims, 8 Drawing Sheets

(56) References Cited

OTHER PUBLICATIONS

Jacob Eliosoff et al.; Modern Solutions; http://www.cs.mcgill.ca/~cs507/projects/1998/jacob/solutions.html; pp. 1-4.

Gisli R. Hjaltason et al.; Incremental Distance Join Algorithms for Spatial Databases; Proceedings of the 1998 ACM SIGMOD Intl. Conference on Management of Data; Jun. 1998; pp. 237-248; Seattle, WA.

* cited by examiner

INDEX-BASED OPTIMIZATION OF CONVEX HULL AND MINIMUM BOUNDING CIRCLE QUERIES

BACKGROUND

Geometric figures are often used to summarize or model spatial data. Two common geometric figures used to summarize spatial data are the convex hull and the minimum bounding circle. These figures can give a good approximation for a complex original geometry. For example, a convex hull of a complex spatial object can be used to deduce many geometric properties of the spatial object, such as the diameter, the width, and the minimum bounding rectangle. Convex hulls can also be used to perform thematic mapping on a set of points, such as the average household income of houses in a neighborhood. The set of points corresponding to houses in the neighborhood is converted to a region of interest (e.g., polygon) to calculate a metric (e.g., average household income) for the points. A minimum bounding circle may be used in facility location planning, such as selecting a location for a new hospital or fire station that will best serve all households in a region.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

While geometric figures can be useful for spatial data analysis, constructing the geometric figures is computationally intensive. This is because all points in a corpus of spatial data are considered for inclusion in a geometric figure. Thus, as the amount of spatial data increases, construction of a geometric figure can be a bottleneck in the processing of spatial queries.

For example, a convex hull is built by selecting a set of points from the corpus of data that define a polygon that envelops all the data. To select the convex hull points, a lowest point in the corpus of data is selected first, a horizontal line segment having the lowest point as an endpoint is created, and a subsequent point is selected that has a maximum angle with respect to the line segment. Once the point with the maximum angle is identified, the point is selected for inclusion in the complex hull. A new line segment is created with the last selected point and the newly selected point as endpoints and the method continues with finding a next point that has a maximum angle with respect to the new line segment. The method ends when the lowest point is reached again, meaning that a closed polygon is formed by the selected points. Typically, all points in a corpus of spatial data are considered for inclusion in the convex hull. The Graham scan algorithm, a well known algorithm for determining a convex hull has O(nlogn) time complexity, where n is the number of points in the corpus of spatial data being summarized.

To determine a minimum bounding circle given two points of data from a corpus of data, a third point is selected from the corpus of data that has a minimum angle with respect to the two points of data. Once the third point is selected, several additional steps are performed to determine if a true minimum circle has been found and if so whether the minimum bounding circle includes all three points or only two of the points. If a true minimum bounding circle has not been found, one of the original two points is eliminated and the process repeats with the remaining original point and the newly selected third point. Typically, all points in a corpus of spatial data are considered for selection as the third point. A simple randomized algorithm for determining a minimum bounding circle has an O(n) time complexity.

Existing methods of determining geometric figures that summarize or model a corpus of spatial data consider all points in the corpus for inclusion in the geometric figure, resulting in a computationally intensive process. Systems and methods are described herein that exploit a hierarchical index on spatial data to guide the selection of candidate points that are considered for inclusion in the geometric figure. In this manner, the number of points considered for inclusion in the geometric figure can be drastically reduced, as compared to methods that consider all points, significantly improving the speed with which the geometric figure is determined.

Figure 1:
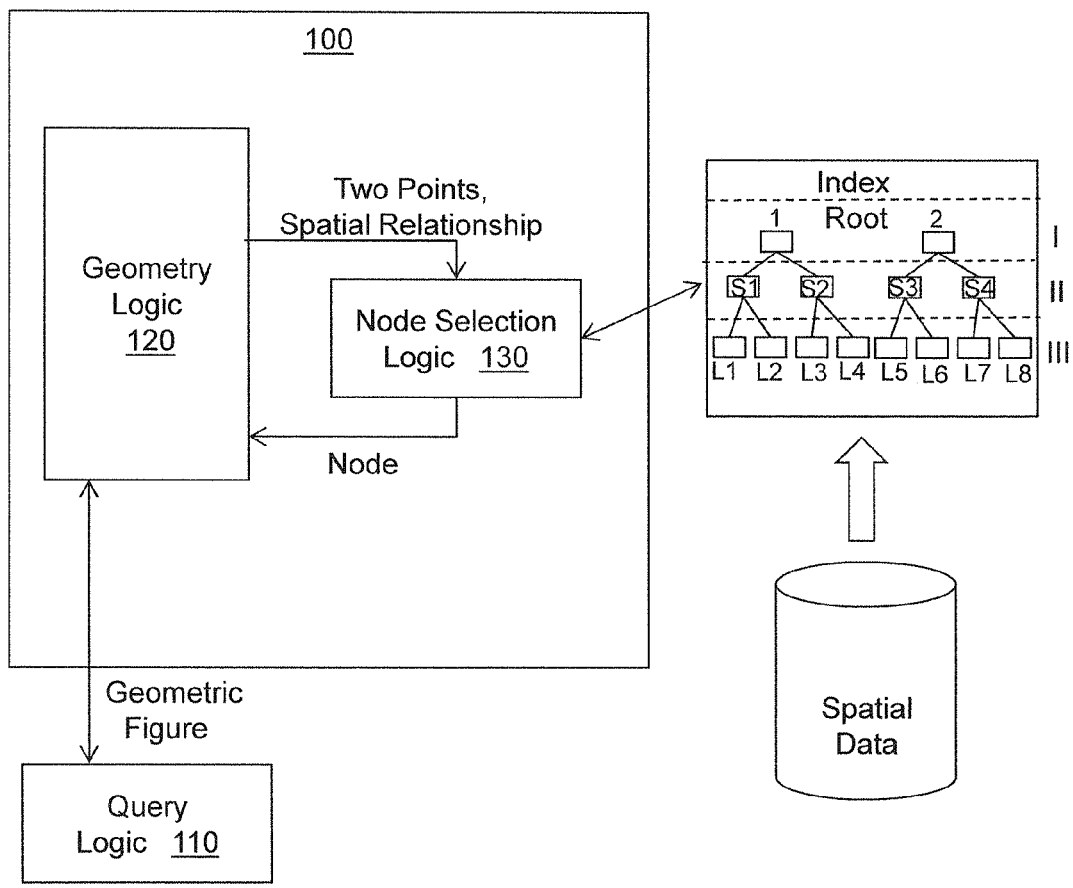
FIG. 1 illustrates one embodiment of an apparatus associated with index-based optimization of geometric figure-related queries on spatial data.

FIG. 1 illustrates one embodiment of a computing system 100 that access a hierarchical index to guide the consideration of spatial data points for possible inclusion in a geometric figure summarizing the spatial data. The system 100 is configured to receive, from a query logic 110, a query that requests a geometric figure summarizing a given corpus of spatial data stored in a database. Example geometric figures include a convex hull or a minimum bounding circle. The system 100 is configured to access an index on the spatial data stored in the database to select one or more spatial data points for inclusion in the requested geometric figure and to return the geometric figure to the query logic 110.

The index accessed by the computing system 100 is a hierarchical index that summarizes the corpus of spatial data. The index is a hierarchical arrangement of one or more nodes arranged in paths from root node entries (e.g., R1 and R2), through intervening node entries (e.g., S1-S4) to leaf node entries (e.g., L1-L8). The index is hierarchical because each node is contained in all nodes in a path leading to the node. The index has levels (e.g., levels I, II, and III) that reflect a level of granularity. While only three levels are shown in the index in FIG. 1, indexes may have many more levels.

For the purposes of this description, and in some embodiments, the index has an R-tree structure. The R-tree has unique properties that facilitate its use in guiding node selection for construction of geometric figures. However, other hierarchical indexes may be used. In the R-tree structure, the root node entries and intervening node entries are minimum bounding rectangles (MBRs) that are stored as two corner points. The leaf node entries are data points in the corpus of spatial data.

The system 100 includes a geometry logic 120 and a node selection logic 130. The geometry logic 120 is configured to construct a geometric figure specified by a received query. The received query specifies a corpus of spatial data and a geometric figure (e.g., a convex hull or minimum bounding circle) to be constructed for the corpus of spatial data. To construct the geometric figure, the geometry logic 120 interacts with the node selection logic 130 and receives from the node selection logic 130 one or more nodes (e.g., data points) that may be included in the geometric figure. The geometry logic 120 provides, as the input to the node selection logic 130, two points that are related to the query and are selected from the corpus of spatial data. The geometry logic 120 also specifies a spatial relationship (e.g., a maximum angle with respect to the two points or a minimum angle with respect to the two points) to be used by the node selection logic 130 in node selection.

The node selection logic 130 is configured to select a node from the index that has the specified spatial relationship to the specified pair of data points. To select the node, the node selection logic 130 is configured to determine a spatial relationship between the two points and candidate nodes in the index. The candidate nodes are a proper subset of the nodes in the index, meaning that the node selection logic 130 does not determine the spatial relationship between the two points and some non-candidate nodes, saving processing time. The node selection logic 130 is configured to select a candidate node having the specified spatial relationship to the two points. The node selection logic 130 provides the selected node to the geometry logic 120.

Figure 2:
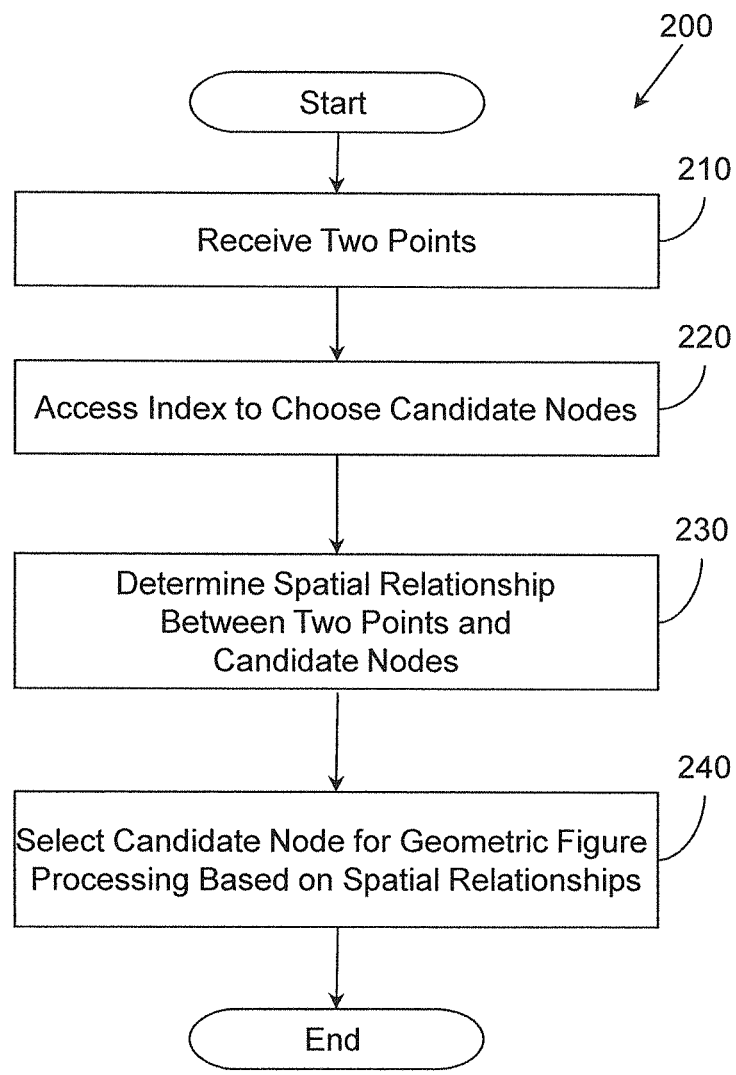
FIG. 2 illustrates one embodiment of a method associated with index-based optimization of geometric figure-related queries on spatial data.

FIG. 2 illustrates one embodiment of a method 200 that selects a node for possible inclusion in a geometric figure describing a corpus of data. The method 200 may be performed by the node selection logic 130 of FIG. 1. The method includes, at 210, receiving two points selected from a corpus of spatial data. At 220, a hierarchical index on the corpus of spatial data is accessed to choose candidate nodes. The index is a hierarchical arrangement of one or more nodes arranged in paths from root node entries to leaf node entries, such that each node is contained in all nodes in a path leading to the node. At 230, the method includes determining a spatial relationship between the two points and the candidate nodes in the index. The candidate nodes are a proper subset of the nodes in the index, meaning that the spatial relationship is not determined between the two points and some (e.g., at least one) non-candidate nodes. At 240, based, at least in part, on the determined spatial relationships, a candidate node is selected for processing related to construction of a geometric figure describing the corpus of spatial data.

Figure 3:
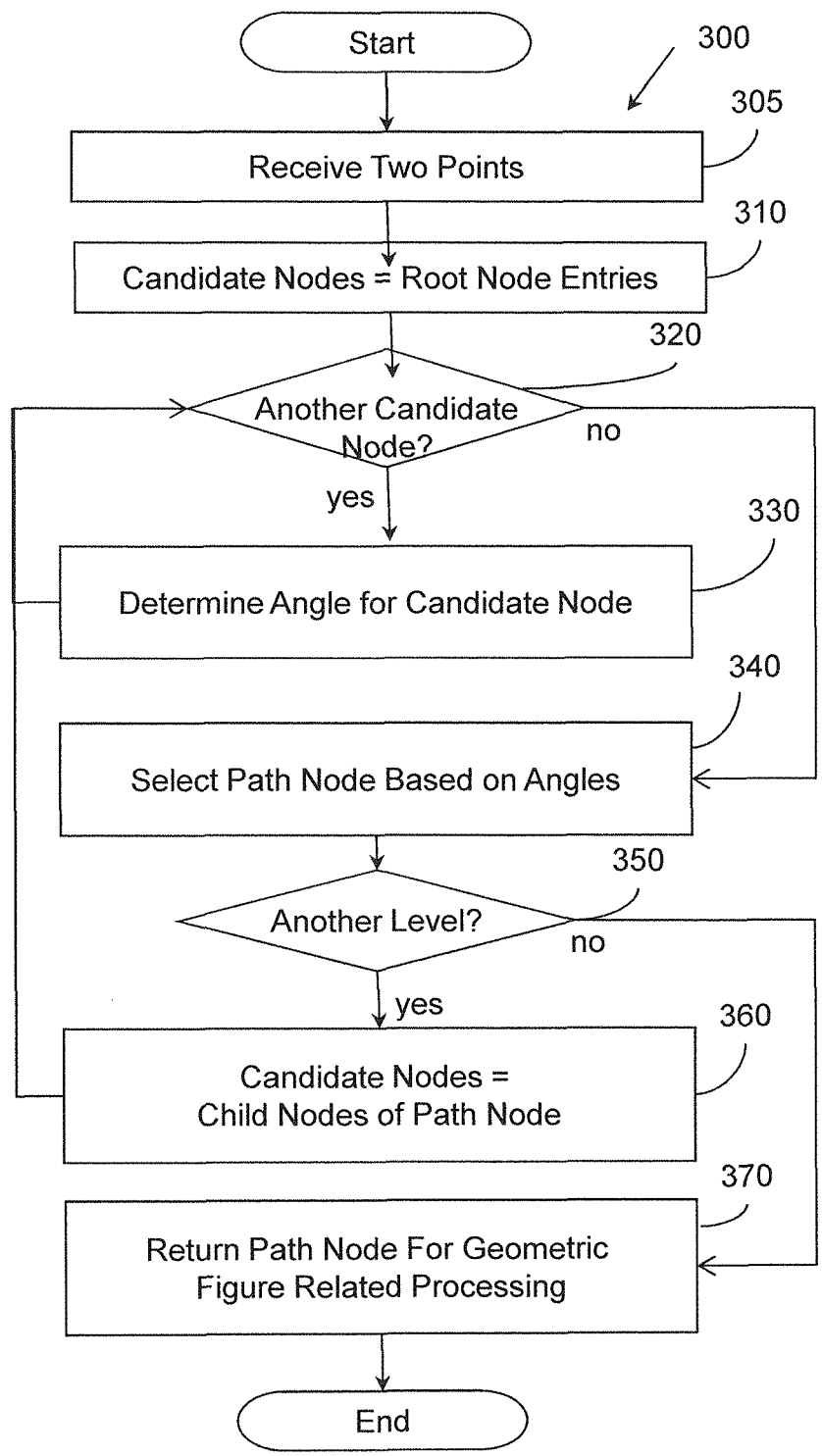
FIG. 3 illustrates one embodiment of a method associated with index-based optimization of geometric figure-related queries on spatial data.

In one embodiment, a leaf node entry is selected for geometric figure-related processing by traversing a path in the index from a chosen root node entry to a leaf node entry based on angles determined between the two points and candidate nodes in the index. FIG. 3 illustrates one embodiment of a method 300 of traversing a hierarchical index to select a leaf node entry for geometric figure-related processing. At 305, the two points that form the basis of the process are received. At 310 root node entries are determined to be candidate nodes. At 320-330, respective angles between respective candidate nodes and the two points are determined for all candidate nodes. When angles have been determined for all candidate nodes, at 340 a path node is selected based on the angles determined for the candidate nodes. A path node is a node that lies on the path from the root node entry to the leaf node entry that is selected for geometric figure-related processing. If a convex hull is being constructed, a candidate node having the maximum angle will be selected at 340. If a minimum bounding circle is being constructed, a candidate node having the minimum angle will be selected at 340.

At 350 a determination is made as to whether there is another level of the index that has not been reached. If no levels remain, the path node selected at 340 is a leaf node entry and at 370 the path node is returned for geometric figure-related processing (e.g., inclusion in a convex hull or as the third point for minimum bounding circle). If another level remains, at 360 child nodes of the path node selected at 340 are determined to be candidate nodes. The method returns to 320 and repeats until the index has been traversed by way of selected path nodes to a leaf node entry. The leaf node entry is selected for geometric figure-related processing. The method 300 can be used to find a node having a maximum angle with respect to the two points or a minimum angle with respect to the two points as will be described below with respect to FIGS. 4A-7. The method 300 limits candidate nodes to child nodes of candidate nodes selected as path nodes, reducing the number of angle calculations that are performed.

Convex Hull

Figure 4A:
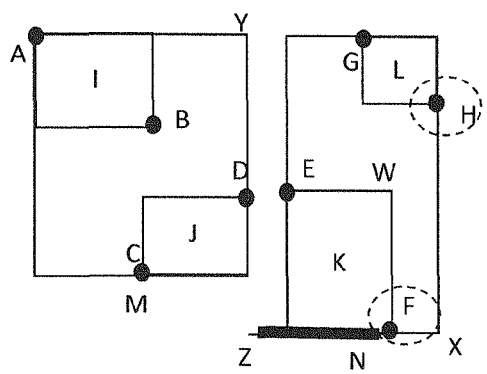
FIGS. 4A-4C illustrate an example of determining a convex hull using one embodiment of index-based optimization of geometric figure-related queries on spatial data.
Figure 4A:
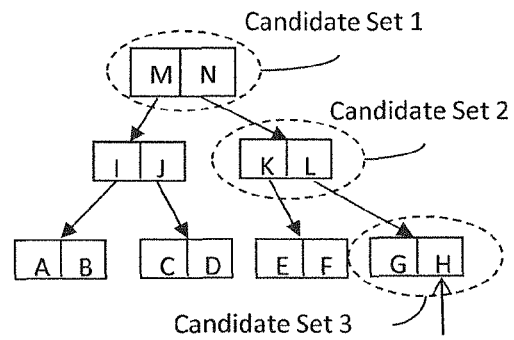
Figure 4B:
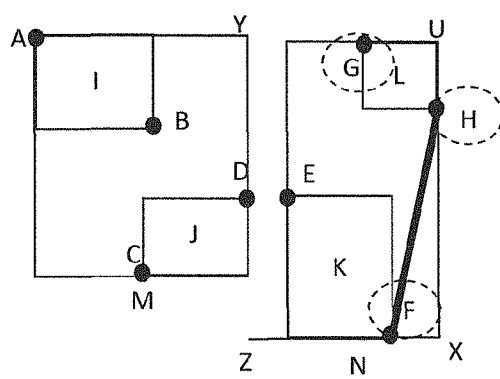
Figure 4B:
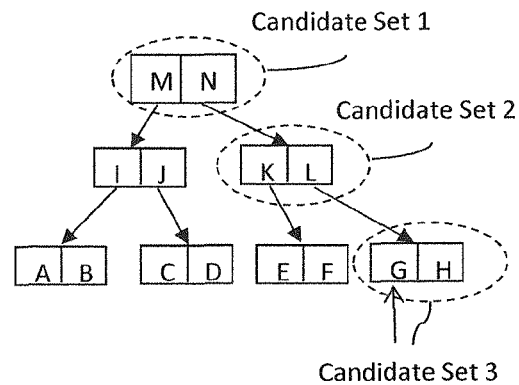
Figure 4C:
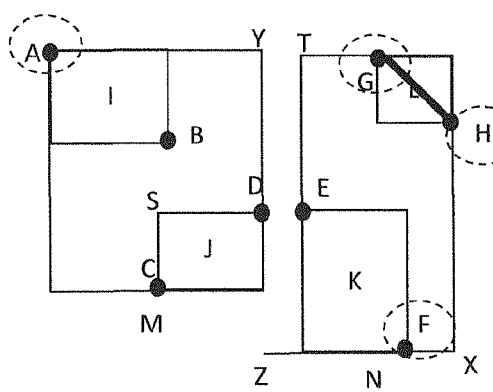
Figure 4C:
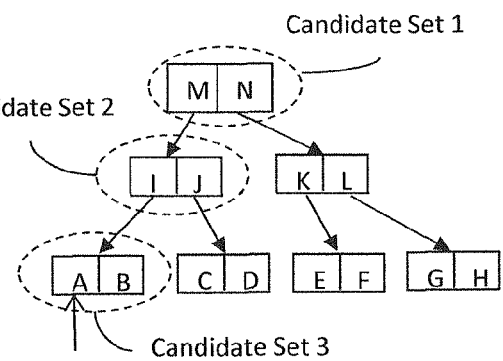

FIGS. 4A-4C illustrate an example of determining a convex hull using one embodiment of index-based processing of geometric figure-related queries on spatial data. In the example, a corpus of spatial data that includes data points {A, B, C, D, E, F, G, H} is referenced in a query that requests a convex hull that encompasses the points. The convex hull is assumed to be counterclockwise. FIG. 4A illustrates an MBR structure on the left that describes the points {A, B, C, D, E, F, G, H} and a corresponding R-tree index on the points on the right. In the first step illustrated in FIG. 4A, the point in the corpus of data having the minimum y coordinate is selected (e.g., point F). Any other point having an extreme value such as the maximum x or y coordinate or the minimum x coordinate could also have been selected as a starting point. Such extreme values can be easily found from an examination of the R-tree. Point F is selected for inclusion in the convex hull.

A horizontal line segment is created by defining a line between point F and a fictional point Z as shown in bold line in the MBR structure. To find the next point in the convex hull, a point (*) in the corpus that creates a maximum angle ZF(*) needs to be identified. The R-tree is used to guide the selection of candidate nodes for which an angle will be calculated. A path is traversed in the R-tree until a leaf node entry is reached. The leaf node entry is selected as a point in the convex hull.

The root node entries M, N are the first candidate nodes. Angles are determined between line segment ZF and nodes M and N. The angle between the line segment and a node is determined by calculating an angle between the line segment and the four corner points of the node's MBR and selecting the maximum angle of the four angles. This is appropriate because it can be proven that the maximum angle between a line segment and an MBR occurs at a corner point of the MBR. The angle between ZF and node N is 180 degrees because the angle between ZF corner point X of MBR N is 180 degrees. The other corner points of N would create angles less than 180 degrees with respect to ZF. Thus, a maximum angle of 180 degrees is determined with respect to node N. In one embodiment, this angle is pushed into a descending priority queue that sorts entries such that the top entry is always the node with the highest angle. Angles between ZF and node M are determined. The maximum angle for node M occurs at corner point Y and is 90 degrees which is less than 180 degrees. The angle for node N is pushed into the descending priority queue and the node M will be positioned below node N.

Once angles have been determined for all of the candidate nodes in a level, the candidate node having the maximum angle is chosen as a path node or the node that defines a next step in the path through the index. The node having the maximum angle can be found at the top of the descending priority queue. In the example, node N has the maximum angle and is selected as a path node. The next set of candidate nodes are the child nodes of path node N, or nodes K and L. Performing the same angle determination described with respect to nodes M and N, it is determined that the maximum angle for node K is ZFW which is 90 degrees and the maximum angle for node L is ZFH which is greater than 90 degrees. These values may be pushed into the descending priority queue. Node L is selected as the next path node and the child nodes of L, namely leaf node entries G and H, become the next set of candidate nodes. Because they are leaf node entries, G and H are data points rather than MBRs and the angles ZFG and ZFH are determined. ZFG is less than ZFH. Point H is selected for inclusion in the convex hull. When point H is selected for inclusion in the convex hull, the priority queue is cleared of all entries. In other words, the priority queue has no entries at the beginning of each search for a next line segment of the convex hull. Entries are pushed into the priority queue on the way down the path from the root node entries to the leaf node entries.

A new line segment is formed between previously selected point F and newly selected point H, as shown in FIG. 4B. The steps outlined with respect to FIG. 4A are repeated for line segment FH. The sets of candidate points selected based on the determination of angles are circled in phantom in the R-tree in 4B. In the root level, node N is selected because FHU is greater than FHY. In the next level node L is selected because FHU is greater than FHE. At the leaf level, point G is selected because point H is already on the convex hull. Point G is selected for inclusion in the convex hull.

A new line segment is formed between previously selected point H and newly selected point G, as shown in FIG. 4C. The steps outlined with respect to FIG. 4A are repeated for line segment HG. The sets of candidate points selected based on the determination of angles are circled in phantom in the R-tree in FIG. 4C. In the root level, node M is selected because HGA is greater than HGT. In the next level node I is selected because HGA is greater than HGS. At the leaf level, point A is selected because HGA is greater than HGB. Point A is selected for inclusion in the convex hull. The selection process will continue with point C being selected based on line segment GA and point F being selected for a second time based on line segment AC. When the first leaf node entry selected is reached for a second time, the convex hull is closed and complete and includes points {F, H, G, A, C}.

As can be seen from the example of FIGS. 4A-4B, using the R-tree to guide the search for points for the convex hull dramatically reduces the number of candidate nodes for which angles must be determined. Children of candidate nodes that are not selected as a path node are not included in the set of candidate nodes for the next level. FIG. 4A illustrates that in the selection of point H for the convex hull, no child nodes of candidate nodes M or K are chosen as candidate nodes, cutting the number of angle calculations by more than half. The selection process for each node in the convex hull is similarly streamlined.

Figure 5:
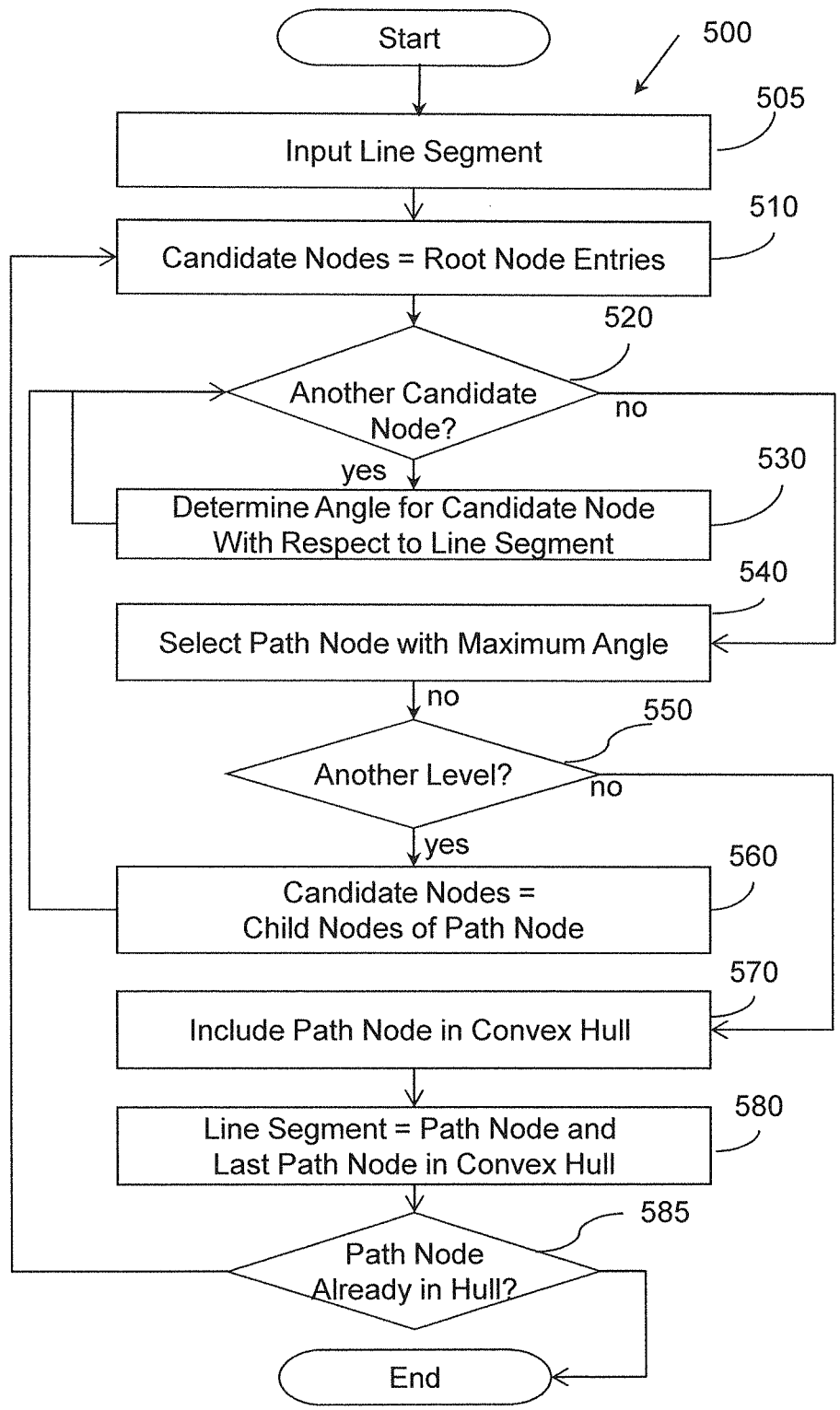
FIG. 5 illustrates one embodiment of a method associated with index-based optimization of queries requesting a convex hull.

FIG. 5 illustrates one embodiment of a method 500 that constructs a convex hull using a hierarchical index to guide node selection. The method 500 may be performed by the system 100 of FIG. 1. At 505, a line segment is received. The first endpoint of the line segment may be a point that is generated for analysis purposes and is not in the corpus of data. The second endpoint in the line segment is in the corpus of data and is used as the vertex in angle calculations. The line segment may have been created by selecting a data point having a lowest y coordinate as the second endpoint and creating a horizontal line segment to a fictional point that is the first endpoint.

At 510 root node entries in the index are chosen as candidate nodes. At 520-530, respective angles between respective candidate nodes and the line segment are determined for all candidate nodes. When angles have been determined for all candidate nodes, at 540 a path node having a maximum angle is selected.

At 550 a determination is made as to whether there is another level of the index that has not been reached. If another level remains, at 560 child nodes of the path node selected at 540 are chosen as candidate nodes. The method returns to 520 and repeats until the index has been traversed by way of selected path nodes to a leaf node entry. If at 550 no levels remain, the path node selected at 540 is a leaf node entry and at 570 the path node is included in the convex hull. At 580, a new line segment is created with the newly selected path node and a last path node. At 545, it is determined whether the path node selected at 540 is already part of the convex hull. If the path node is already in the convex hull, the hull is complete and the method ends. If not, the method returns to 510 to select another path node for the convex hull Minimum Bounding Circle Minimum bounding circle solutions input three points and test the angles between the three points to determine whether two or three of points define a minimum bounding circle. If the three points do not meet the angle constraints, one of the points is discarded and a search for a new third point is performed with respect to the two remaining points. Two points Q and R that form a line segment that lies to the right of all other points are used to begin the process. Q is below and to the left of R. To find the third point, a point S that makes the minimum angle QSR is found. In one minimum bounding circle solution, the points Q, R, S are checked against the following constraints to determine if the three points include the points that make a minimum bounding circle: If QSR is greater than or equal to 90 degrees, the points Q and R (e.g., the original two points) define the diameter of the minimum bounding circle. If both QRS and SQR are less than 90 degrees, Q, R, and S all lie on the minimum bounding circle. If QRS is greater than 90 degrees, a new third point having a minimum angle with respect to points Q and S is found. In all other cases, a new third point having a minimum angle with respect to points R and S is found.

Figure 6A:
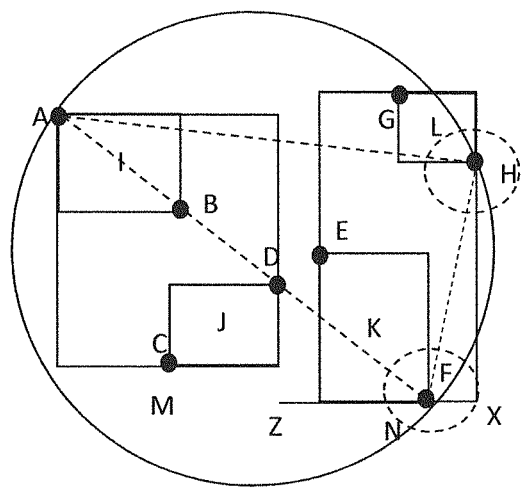
FIGS. 6A-6D illustrate an example of determining a minimum bounding circle using one embodiment of index-based optimization of geometric figure-related queries on spatial data.

FIG. 6A illustrates how hierarchical index can be used to guide the search for the third points that are considered for inclusion in a minimum bounding circle. FIG. 6A includes the corpus of data for which a convex hull was illustrated in FIG. 4A-4C. The algorithm begins with an initial pair of points that are presumed to be on the bounding circle. It is assumed that the third point is to the left of the two points. In one embodiment, the initial two points are found by determining the first two points in the convex hull for the corpus of data. This is because all remaining points will be to the left of the first two points in the convex hull. Recall that for this corpus of data the first point was point F because F has the minimum y coordinate of all the data points. H is the first point that is selected as having the maximum angle with respect to horizontal line segment ending with point F. The initial two points for the process of determining a minimum bounding circle are F and H.

Figure 6B:
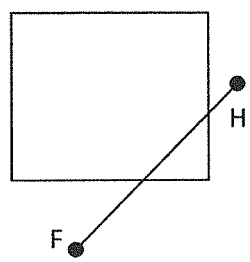
Figure 6C:
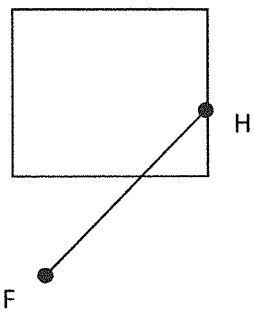
Figure 6D:
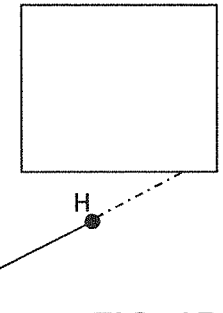

As with the convex hull process, the index is used to guide the search for the third point which has the minimum angle point. To determine the minimum angle with respect to the two points and a node, angles are found with respect to the two points and the four corners of the node's MBR and also between the two points and an intersection point between a line formed by the two points and the edges of the MBR. Referring now to FIGS. 6B and 6C, it can be seen that if the line segment between the two points intersects the node's MBR, the minimum angle will occur at one of the corner points. As can be seen in 6D, if the line segment between the two points does not intersect the MBR, the minimum angle of 0 is found at the intersection point of the line that includes the two points and the edge of MBR.

Returning to the example in FIG. 6A, beginning with points F and H, third points are selected by traversing the index from root node entry to leaf node entry. Point A is selected as a third point that meets the angle constraints and the minimum bounding circle is formed by points F, H, and A.

Figure 7:
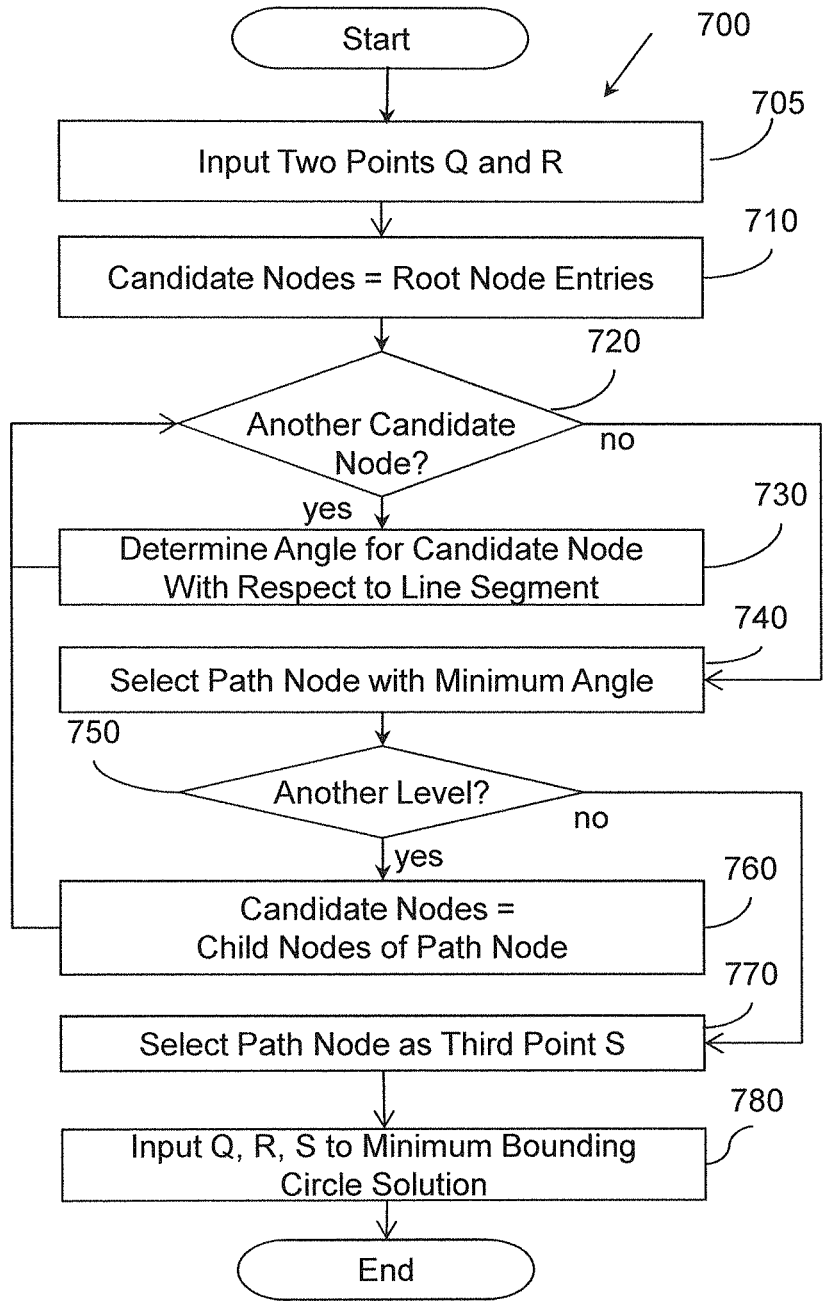
FIG. 7 illustrates one embodiment of a method associated with index-based optimization of queries requesting a minimum bounding circle.

FIG. 7 illustrates one embodiment of a method 700 that selects third points for consideration by a minimum bounding circle solution that checks three points against constraints to see if a minimum bounding circle has been found. At 705, two points Q and R are input. Initial values for points Q and R can be selected as described above by finding the lowest y coordinate point and the next point on the convex hull. At 710, the root node entries in the index are chosen as candidate nodes. At 720-730, a minimum angle for each candidate node in the level is determined. To determine the minimum angle for a node, angles formed by the two points and the corner points of the node's MBR are computed. An angle is also computed between and intersection point of the line formed by the two points and the node's MBR. The minimum of these five angles is determined to be the minimum angle for the candidate node. Once minimum angles have been found for all candidate nodes, at 740 the candidate node with the lowest minimum angle is selected as a path node.

At 750 a determination is made as to whether there is another level of the index that has not been reached. If another level remains, at 760 child nodes of the path node selected at 740 are chosen as candidate nodes. The method returns to 720 and repeats until the index has been traversed by way of selected path nodes to a leaf node entry. If at 750 no levels remain, the path node selected at 740 is a leaf node entry and at 770 the path node is selected as the third point "S". At 780, the points Q, R, and S are input to the minimum bounding circle solution. If the minimum bounding circle solution determines that a minimum bounding circle has not been found, the method 700 may be repeated starting at 705 with a new pair of initial points provided by the minimum bounding circle solution.

Adaptation for Geodetic Data

In some spatial databases, two dimensional geodetic coordinates are converted to three dimensional earth-centered coordinates. R-tree nodes are minimum bounding boxes (MBBs) rather than MBRs. Each MBB has 12 bounding edges. The techniques above can be adapted to handle geodetic data.

To adapt the convex hull technique described above, the angles that are constructed for node selection purposes are geodetic angles constructed from two geodetic lines (or great-circle lines). To find the first line segment, rather than using a horizontal line, a geodetic line is formed such that the lowest point can have a 90 degree angle to true north. The maximum angle for an MBB with respect to a line segment occurs along one of the 12 bounding edges. Only portions of the bounding edges that are on the surface of the earth are used to determine the maximum angle of the MBB.

To adapt the minimum bounding circle technique described above, it is assumed that the Earth can be approximated to be a sphere. Three points on the Earth can construct a circle. It is also assumed that the geodetic minimum bounding circle is smaller than a hemisphere. The initial two points are in three dimensional Cartesian space and the angle that are constructed are also three dimensional angles constructed by two three dimensional straight lines. To determine a minimum angle for a node, angles are computed between the eight corner points of the node as well as the intersection point between the three dimensional line formed by the two points which is 0 if the line segment is outside the MBB. The line segment is a straight line, not a two dimensional geodetic line, and the angle with respect to an intersection point is 0. The minimum of the angles calculated for the node is selected as the minimum angle for a node. The path in the index is traversed to the leaf node entry having the minimum angle, which is selected as the third point and the minimum bounding circle solution performs the same constraint tests on the three points as described above.

As can be seen from the foregoing description, using a hierarchical index on spatial data to guide the selection of candidate nodes that are analyzed for possible inclusion in a geometric figure summarizing the spatial data can significantly reduce processing complexity and time.

Computer Embodiment

Figure 8:
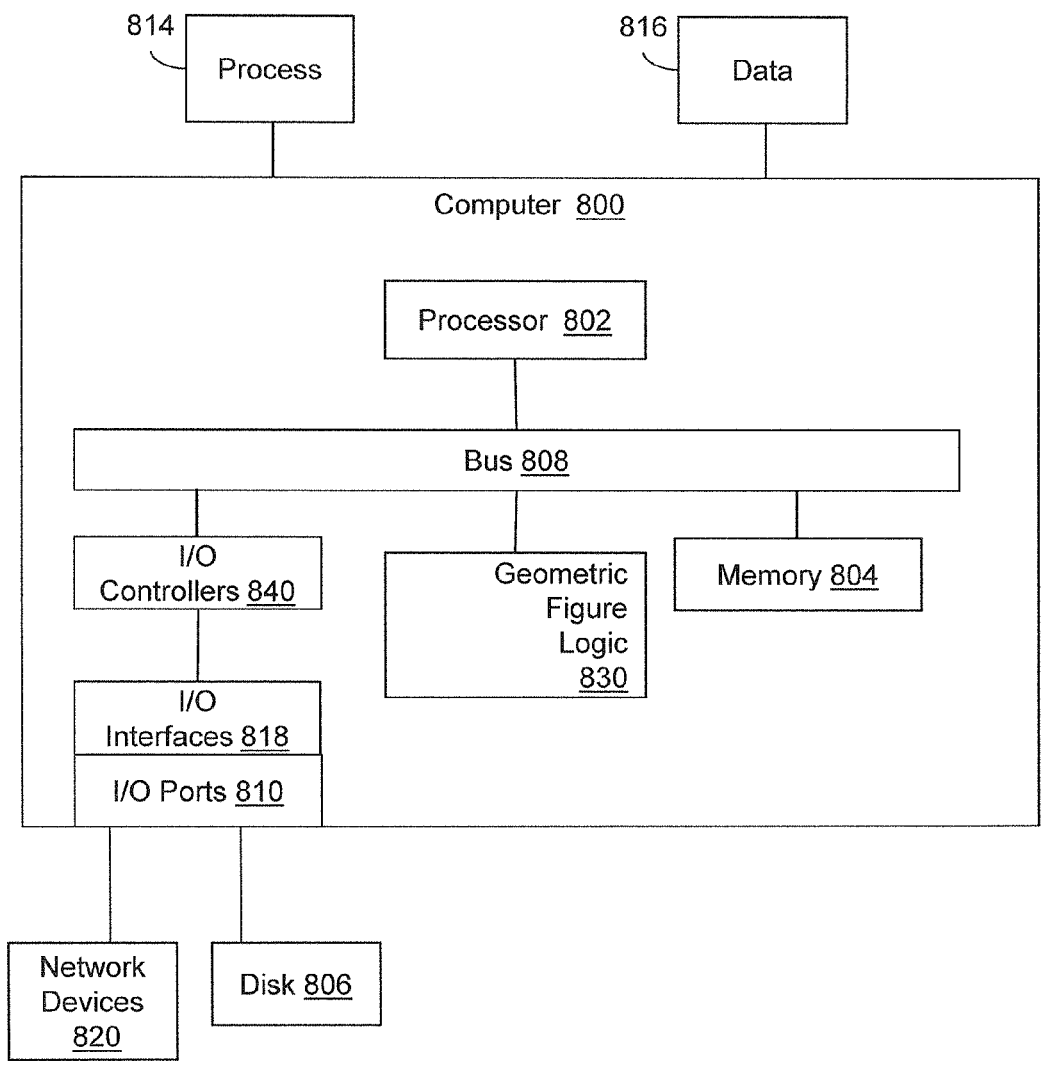
FIG. 8 illustrates an embodiment of a computing system configured with the example systems and/or methods disclosed.

FIG. 8 illustrates an example computing device that is configured and/or programmed with one or more of the example systems and methods described herein, and/or equivalents. The example computing device may be a computer 800 that includes a processor 802, a memory 804, and input/output ports 810 operably connected by a bus 808. In one example, the computer 800 may include a geometric figure logic 830 configured to facilitate construction of geometric figures by accessing an index on spatial data similar to logic/system 100 shown in FIG. 1. In different examples, the logic 830 may be implemented in hardware, a computer storage medium with stored instructions, firmware, and/or combinations thereof. While the geometric figure logic 830 is illustrated as a hardware component attached to the bus 808, it is to be appreciated that in one example, the geometric figure logic 830 could be implemented in the processor 802.

In one embodiment, the geometric figure logic 830 or the computer is a means (e.g., hardware, computer storage medium, firmware) for receiving two points selected from a corpus of spatial data and accessing a hierarchical index on the corpus of spatial data to choose candidate nodes. The computer may also be means for determining a spatial relationship between the two points and the set of candidate nodes in the index that is a subset of all nodes in the index. The computer may be means for selecting a candidate node for processing related to construction of a geometric figure describing the corpus of spatial data based on the determined spatial relationships.

The means may be implemented, for example, as an ASIC programmed to access a hierarchical index to construct geometric figures summarizing spatial data. The means may also be implemented as stored computer executable instructions that are presented to computer 800 as data 816 that are temporarily stored in memory 804 and then executed by processor 802.

The geometric figure logic 830 may also provide means (e.g., hardware, computer storage medium that stores executable instructions, firmware) for traversing a hierarchical index on spatial data to a leaf node entry that is to be considered for inclusion in a geometric figure describing the spatial data.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A storage disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

In another embodiment, the described methods and/or their equivalents may be implemented with computer executable instructions. Thus, in one embodiment, a computer storage medium stores computer executable instructions configured to cause a machine (e.g., processor, computer, and so on) cause the machine (and/or associated components) to perform steps in the described methods 200, 300, 500, and 700.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores computer-readable instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing instructions executable by a processor of a computer that when executed cause the computer to:
receive two points of data selected from a corpus of spatial data;
access a hierarchical index on the corpus of spatial data to choose candidate nodes, wherein the hierarchical index comprises a hierarchical arrangement of one or more nodes arranged in paths from root node entries to leaf node entries;
determine a spatial relationship between the two points and the candidate nodes in the hierarchical index, where the candidate nodes comprise a proper subset of the nodes in the hierarchical index, such that the spatial relationship is not determined between the two points and non-candidate nodes; and
based, at least in part, on the determined spatial relationships, select a candidate node for construction of a geometric figure describing the corpus of spatial data;
wherein the instructions further comprise instructions that when executed by the processor cause the computer to choose candidate nodes by:
at each level in the hierarchical index, starting with the root node entries as the candidate nodes and until a leaf node entry is selected:
determining respective angles between a line segment having the two points as endpoints and respective candidate nodes in the level;
selecting a candidate node as a path node, based at least in part, on the determined angles;
choosing child nodes of the path node in a next level as candidate nodes, such that child nodes of the candidate nodes not selected as the path node are not chosen as candidate nodes in the next level; and
when a leaf node entry is selected as a path node, selecting the leaf node entry for the construction of the geometric figure.

2. The non-transitory computer-readable medium of claim 1, where the nodes comprise minimum bounding rectangles (MBRs), and where the instructions further comprise instructions configured to cause the computer to determine the spatial relationship between the two points and a candidate node by:
determining respective spatial relationships between the two points and respective corner points of the MBR for the candidate node; and
selecting one of the respective spatial relationships between the two points and respective corner points as the spatial relationship for the candidate node.

3. The non-transitory computer-readable medium of claim 1, wherein the geometric figure comprises a minimum bounding circle, and where the instructions comprise instructions configured to cause the computer to:
select a candidate node having a minimum determined angle as the path node for each level; and
output a set of three points including the two points and the selected leaf node entry to a minimum bounding circle solution.

4. The non-transitory computer-readable medium of claim 1, wherein the geometric figure comprises a convex hull, and where the instructions comprise instructions configured to cause a computer to:
select a candidate node having the maximum determined angle as the path node for each level; and
include the selected leaf node entry in the convex hull.

5. The non-transitory computer-readable medium of claim 4, wherein the instructions further comprise instructions configured to cause the computer to:
at each level in the hierarchical index, starting with root node entries as candidate nodes and until the leaf node entry is selected a second time,
form a next line segment that includes an end point of the line segment and a most recently included leaf node entry;
determine respective angles between the next line segment and respective candidate nodes in the level;
choose a candidate node having a maximum angle with respect to the next line segment as a path node;
choose child nodes of the path node in a next level as candidate nodes, such that child nodes of candidate nodes not chosen as the path node are not chosen as candidate nodes in the next level; and
when a leaf node entry is chosen as a path node, include the leaf node entry in the convex hull.

6. The non-transitory computer-readable medium of claim 1, wherein the spatial data comprise points corresponding to three dimensional Earth centered coordinates and where the instructions further comprise instructions configured to cause the computer to:
determine respective three dimensional angles between a line segment having the two points as endpoints and respective candidate nodes in the level; and
select a candidate node as a path node, based at least in part, on the determined three dimensional angles.

7. A computing system comprising:
a processor connected to at least a memory;
a non-transitory computer storage medium connected to at least one data communication path to the processor and the memory;
a hierarchical index on a corpus of spatial data, wherein the hierarchical index comprises a hierarchical arrangement of one or more nodes arranged in paths from root node entries to leaf node entries;
node selection logic stored on the non-transitory computer storage medium and including instructions executable by the processor that cause the processor to:

receive two points selected from the corpus of spatial data;

access the hierarchical index to choose candidate nodes;

determine a spatial relationship between the two points and the candidate nodes in the hierarchical index, wherein the candidate nodes comprise a proper subset of the nodes in the hierarchical index, such that the spatial relationship is not determined between the two points and some non-candidate nodes; and based, at least in part, on the determined spatial relationships, select a candidate node for constructing a geometric figure describing the corpus of spatial data;

wherein the node selection logic is configured to choose candidate nodes by:

at each level in the hierarchical index, starting with root node entries as candidate nodes and until a leaf node entry is selected, determining respective angles between a line segment having the two points as endpoints and respective candidate nodes in the level;

selecting a candidate node as a path node, based at least in part, on the determined angles;

choosing child nodes of the path node in a next level as candidate nodes, such that child nodes of candidate nodes not selected as the path node are not chosen as candidate nodes in the next level; and when a leaf node entry is selected as a path node, selecting the leaf node entry for constructing the geometric figure.

8. The computing system of claim 7, further comprising:
a geometry logic configured to select the two points based on a query on the spatial data and provide the two points to the node selection logic;
where the node selection logic is configured to:
select a candidate node having the minimum determined angle as the path node for each level; and
output a set of three points including the two points and the selected leaf node entry to the geometry logic; and
where the geometry logic is configured to test the three points to determine if two or three of the points define minimum bounding circle that encompasses the corpus of spatial data.

9. The computing system of claim 7, further comprising:
a geometry logic configured to construct a convex hull from leaf node entry selected by the node selection logic; and
where the node selection logic is configured to select a candidate node having the maximum determined angle as the path node for each level.

10. The computing system of claim 9, where the node selection logic is configured to, at each level in the index, starting with root node entries as candidate nodes and until the leaf node entry is selected a second time:
form a next line segment that includes an end point of the line segment and a most recently included leaf node entry;
determine respective angles between the next line segment and respective candidate nodes in the level;
choose a candidate node having a maximum angle with respect to the next line segment as a path node;
choose child nodes of the path node in a next level as candidate nodes, such that child nodes of candidate nodes not chosen as the path node are not chosen as candidate nodes in the next level; and when a leaf node entry is chosen as a path node, include the leaf node entry in the convex hull.

11. The computing system of claim 7, where the spatial data comprise points corresponding to three dimensional Earth centered coordinates and where node selection logic is configured to:
determine respective three dimensional angles between a line segment having the two points as endpoints and respective candidate nodes in the level; and
select a candidate node as a path node, based at least in part, on the determined three dimensional angles.

12. A computer-implemented method performed by a computing device including at least a processor and a memory, the method comprising:
receiving, by the processor, two points of data selected from a corpus of spatial data;
accessing, by the processor, a hierarchical index on the corpus of spatial data to choose candidate nodes, where the hierarchical index comprises a hierarchical arrangement of one or more nodes arranged in paths from root node entries to leaf node entries;
determining, by the processor, a spatial relationship between the two points and the candidate nodes in the hierarchical index, where the candidate nodes comprise a subset of the nodes in the hierarchical index such that the spatial relationship is not determined between the two points and non-candidate nodes; and
based, at least in part, on the determined spatial relationships, selecting a candidate node for construction of a geometric figure describing the corpus of spatial data;
wherein choosing candidate nodes comprises:
at each level in the index, starting with root node entries as candidate nodes and until a leaf node entry is selected,
determining respective angles between a line segment having the two points as endpoints and respective candidate nodes in the level;
selecting a candidate node as a path node, based at least in part, on the determined angles;
choosing child nodes of the path node in a next level as candidate nodes, wherein the child nodes of the candidate nodes not selected as the path node are not chosen as candidate nodes in the next level; and
when a leaf node entry is selected as a path node, selecting the leaf node entry for the construction of the geometric figure.

13. The computer-implemented method of claim 12, where the nodes comprise minimum bounding rectangles (MBRs), and where the method further comprises determining the spatial relationship between the two points and a candidate node by:
determining respective spatial relationships between the two points and respective corner points of the MBR for the candidate node; and
selecting one of the respective spatial relationships between the two points and respective corner points as the spatial relationship for the candidate node.

14. The computer-implemented method of claim 12, where the geometric figure comprises a minimum bounding circle, and where the method comprises:
selecting a candidate node having the minimum determined angle as the path node for each level; and
outputting a set of three points including the two points and the selected leaf node entry to a minimum bounding circle solution.

15. The computer-implemented method of claim 12, where the geometric figure comprises a convex hull, and where the method comprises:
  selecting a candidate node having the maximum determined angle as the path node for each level; and
  including the selected leaf node entry in the convex hull.

16. The computer-implemented method of claim 15, further comprising:
  at each level in the index, starting with root node entries as candidate nodes and until the leaf node entry is selected a second time,
    forming a next line segment that includes an end point of the line segment and a most recently included leaf node entry;
    determining respective angles between the next line segment and respective candidate nodes in the level;
    choosing a candidate node having a maximum angle with respect to the next line segment as a path node;
    choosing child nodes of the path node in a next level as candidate nodes, such that child nodes of candidate nodes not chosen as the path node are not chosen as candidate nodes in the next level; and
    when a leaf node entry is chosen as a path node, including the leaf node entry in the convex hull.

17. The computer-implemented method of claim 12, where the spatial data comprise points corresponding to three dimensional Earth centered coordinates and where the method further comprises:
  determining respective three dimensional angles between a line segment having the two points as endpoints and respective candidate nodes in the level;
  selecting a candidate node as a path node, based at least in part, on the determined three dimensional angles.

* * * * *

UNITED STATES PATENT AND TRADEMARK OFFICE
CERTIFICATE OF CORRECTION

PATENT NO. : 9,436,731 B2
APPLICATION NO. : 14/200415
DATED : September 6, 2016
INVENTOR(S) : Hu et al.

Page 1 of 1

It is certified that error appears in the above-identified patent and that said Letters Patent is hereby corrected as shown below:

In the Specification

In Column 6, Line 53, after "convex hull" insert -- . --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*